United States Patent
Hathaway et al.

(10) Patent No.: US 8,655,634 B2
(45) Date of Patent: Feb. 18, 2014

(54) MODELING LOADING EFFECTS OF A TRANSISTOR NETWORK

(75) Inventors: David J. Hathaway, Underhill Center, VT (US); Vasant Rao, Fishkill, NY (US); Ronald D. Rose, Essex Junction, VT (US); Ali Sadigh, Irvine, CA (US); Jeffrey P. Soreff, Poughkeepsie, NY (US); David W. Winston, Asheville, NC (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 12/721,227

(22) Filed: Mar. 10, 2010

(65) Prior Publication Data

US 2011/0224965 A1    Sep. 15, 2011

(51) Int. Cl.
*G06F 17/50*    (2006.01)

(52) U.S. Cl.
USPC ............................................ 703/14; 716/101

(58) Field of Classification Search
USPC ...................................... 703/13, 14; 716/101
See application file for complete search history.

(56) References Cited

U.S. PATENT DOCUMENTS

| | | | |
|---|---|---|---|
| 5,636,130 A | 6/1997 | Salem et al. | |
| 5,703,798 A * | 12/1997 | Dhar | 703/14 |
| 5,946,475 A | 8/1999 | Burks et al. | |
| 6,658,635 B1 * | 12/2003 | Tanimoto | 716/108 |
| 7,213,221 B1 | 5/2007 | Celik et al. | |
| 2003/0115035 A1 | 6/2003 | Kulshreshtha et al. | |
| 2011/0077882 A1 * | 3/2011 | Agrawal et al. | 702/65 |

* cited by examiner

*Primary Examiner* — David Silver
*Assistant Examiner* — Andre Pierre Louis
(74) *Attorney, Agent, or Firm* — Richard M. Kotulak; Hoffman Warnick LLC (57) ABSTRACT

A system, method and program product for modeling load effects of a load CCC (channel connected component) in a transistor network. A system is disclosed that includes an analysis system that determines allowable logical state and transition functions for nets in a load CCC for a transition or state of a driving CCC for which a load condition is being determined; a trace system that traverses paths in the load CCC from a set of input terminals; and an element replacement system that replaces circuit elements in the load CCC to create a modeled CCC, wherein a circuit element replacement is based on a type of circuit element encountered along a trace, and state and transition functions of nets connected to an encountered circuit element.

17 Claims, 4 Drawing Sheets

MODELING LOADING EFFECTS OF A TRANSISTOR NETWORK

TECHNICAL FIELD

This disclosure relates generally to analyzing transistor networks, and more particularly, to a solution for modeling the loading effects of driven channel connected components.

BACKGROUND ART

Figure 1:
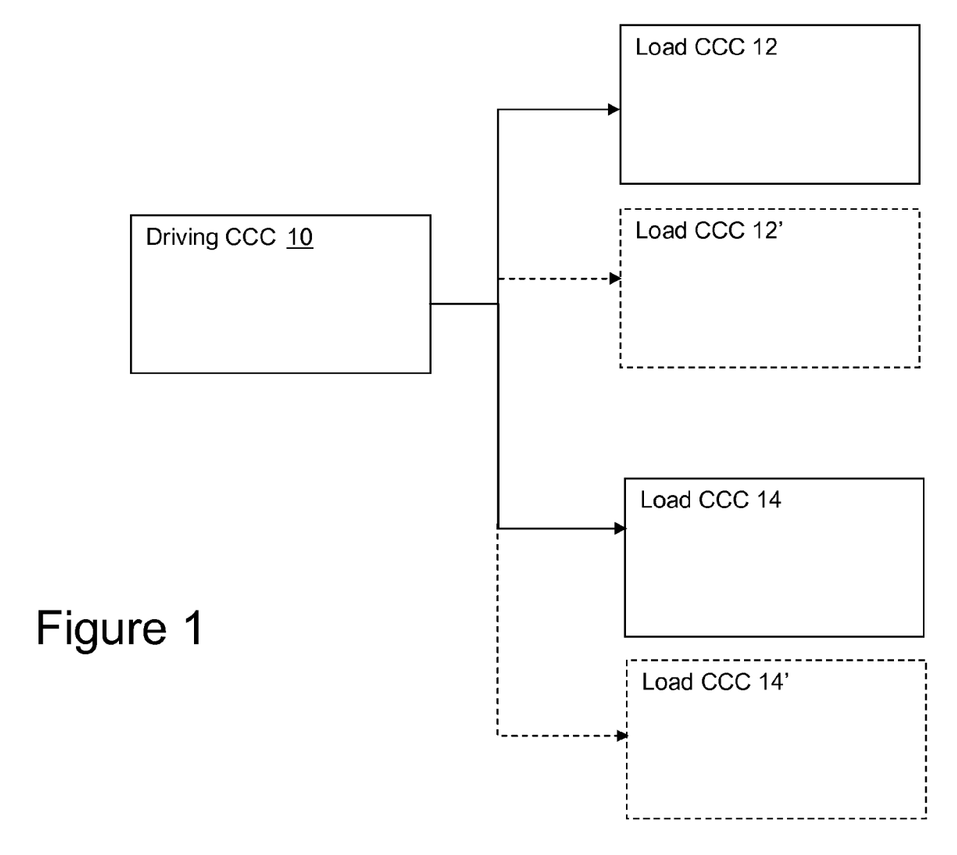
FIG. 1 shows a driving CCC, as well as load and modeled CCCs in accordance with an embodiment of the invention.

Transistor-level static timing analysis (STA) involves subdividing a circuit design into smaller subcircuits called channel connected components (CCCs), whose outputs drive only interconnect (wires) and transistor gate inputs of other CCCs. Starting from the primary inputs, the signal delays for each CCC that constitute a signal path through the circuit design are calculated and summed using well known static timing analysis methods to identify which paths are critical to the operation of the circuit design. CCCs consist of transistors along with parasitic interconnect elements. The delays of the CCC are most accurately calculated by simulating all the CCC circuit elements using a circuit simulation tool (e.g., SPICE) to obtain the signal delay from each CCC input transition to each CCC output transition that it can cause. However, the accuracy of the delay computation for a driving CCC is limited by how accurately the effects of all load CCCs are modeled when simulating the driving CCC. For instance, as shown in FIG. 1, analysis of driving CCC 10 is impacted by load CCC 12 and load CCC 14.

Transistor-level analysis in other domains such as signal noise and power analysis may similarly divide a circuit design into CCCs and separately analyze the CCCs, summing or propagating different values (e.g., noise pulse magnitudes or power supply current instead of delay). The accuracy of analysis in these domains is similarly constrained by the accuracy of driven CCC load modeling.

One method to account for the effects of the load CCCs 12, 14 is simply to include all circuit elements of the load CCCs 12, 14 in the actual simulation of the driving CCC 10. This would result in a high degree of accuracy of the timing results of a driver CCC 10 at the cost of added simulation time. Since transistor-level STA run-time is dominated by the computationally intensive circuit simulation of CCCs, this option can be prohibitively expensive in most cases. Therefore, other methods of modeling a load CCC input include replacing the load CCC with some approximation (e.g., model load CCC 12' and model load CCC 14') such as a single fixed capacitor, a resistor-capacitor (RC) pi model characterized to minimize the error in delay (or some other metric), or the gate terminals of one or more transistors (i.e., the same set of transistor types and sizes present in the load CCC) whose source and drain terminals are grounded. These approaches however suffer from lack of generality and accuracy, as the first two fail to account for nonlinear transistor gate capacitances, and none account for Miller Effect, which is an apparent change in the equivalent grounded capacitance manifested by an ungrounded capacitor (e.g., a capacitor coupling the input and output of a circuit) whose other terminal is also switching. The magnitude of the Miller Effect may itself vary widely depending on the activity of side inputs, which are inputs of the load CCC other than the one whose load is being modeled.

In most applications it is neither possible nor desirable to model all possible loading effects (e.g., as they depend on side input activity), but instead a possible range of simulation results (e.g., minimum and maximum delay calculation) is desired, and calculation of this range of results requires a range of possible loading effects of driven CCCs.

SUMMARY

Aspects of this invention provide a simplified approach for modeling the loading effects of load (or driven) CCCs to improve the accuracy of static timing analysis of a driving CCC. The modeling techniques can be implemented without adding significant simulation overhead, and allow for modeling of a range of possible loading effects of the load CCC.

A first aspect of the invention provides a system for modeling a load effect of a load channel connected component (CCC) in a transistor network, comprising: an analysis system that determines allowable logical state and transition functions for nets in a load CCC for a transition or state of a driving CCC for which a load condition is being determined; a trace system that traces paths in the load CCC from a set of input terminals; and an element replacement system that replaces circuit elements in the load CCC to create a modeled CCC, wherein circuit element replacements are based on a type of circuit element encountered along a trace, and state and transition functions of the nets connected to an encountered circuit element.

A second aspect of the invention provides a computer-implemented method for modeling a load effect of a load CCC in a transistor network, comprising: determining allowable logical state and transition functions for nets in a load CCC for a transition or state of a driving CCC for which a load condition is being determined; tracing paths in the load CCC from a set of input terminals; and replacing circuit elements in the load CCC to create a modeled CCC based on a type of circuit element encountered along a trace, and based on state and transition functions of the nets connected to the circuit element.

A third aspect of the invention provides a computer-readable storage medium having a program product stored thereon for modeling a load effect of a load CCC in a transistor network, comprising: program code for determining allowable logical state and transition functions for nets in a load CCC for a transition or state of a driving CCC for which a load condition is being determined; program code for tracing paths in the load CCC from a set of input terminals; and program code for replacing circuit elements in the load CCC to create a modeled CCC based on a type of circuit element encountered along a trace, and based on state and transition functions of the nets connected to the circuit element.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Aspects of this disclosure include an algorithm that converts a load CCC to a minimally sized subcircuit (referred to herein as a modeled CCC) whose topology and element values depend on the inputs of the load CCC. The approach takes into account the state of each node prior to and during input transitions and creates a reduced subcircuit that approximates the original load CCC for a particular transition (logic low to high or high to low.) The reduced subcircuit is then used as a load for detailed circuit simulation of the driving CCC, and offers faster run-time while preserving accuracy and hard-to-capture effects such as the Miller Effect. Different equivalent circuits may be generated for determination of minimum and maximum load effects.

The disclosed approach includes:
1. Determining the allowable logical state and transition functions for nets in the load CCC for the transition or state of the driving CCC for which a load condition is being determined.
2. For each load CCC of the driving CCC, tracing along all paths from the load CCC input terminals (generally gate terminals of one or more field effect transistors (FETs)).
3. For each circuit element encountered in the trace, replacing encountered elements in the load CCC based on the element type and the state and transition functions of the nets connected to the element.
4. Using the equivalent circuit(s) created as load models in a simulation of the driving CCC.

The following concepts are utilized to generate the modeled CCC:
1. A description of the circuit topology and element values in some format of the load CCC and (optionally) of some or all of the larger circuit in which it is embedded.
2. Information about the driving CCC sufficient to determine required states and transitions that occur with the transition(s) of interest.
3. A Boolean representation of the circuit which allows efficient querying of the status of every node in the circuit depending on the inputs.
4. An Equivalent Circuit Lookup database containing the information necessary to replace elements in the load CCC. For example, an inactive transistor (a transistor that does not switch during the transition of the input) will be replaced with appropriate values of resistor(s) and capacitor(s) as a function of its node voltages.

In the following examples, it is assumed that the load CCC is made up of voltage sources, resistors, capacitors, inductors and FETs. However, other circuit elements such as diodes, current sources, bipolar transistors, etc., can follow the same general approach as described below.

Figure 2:
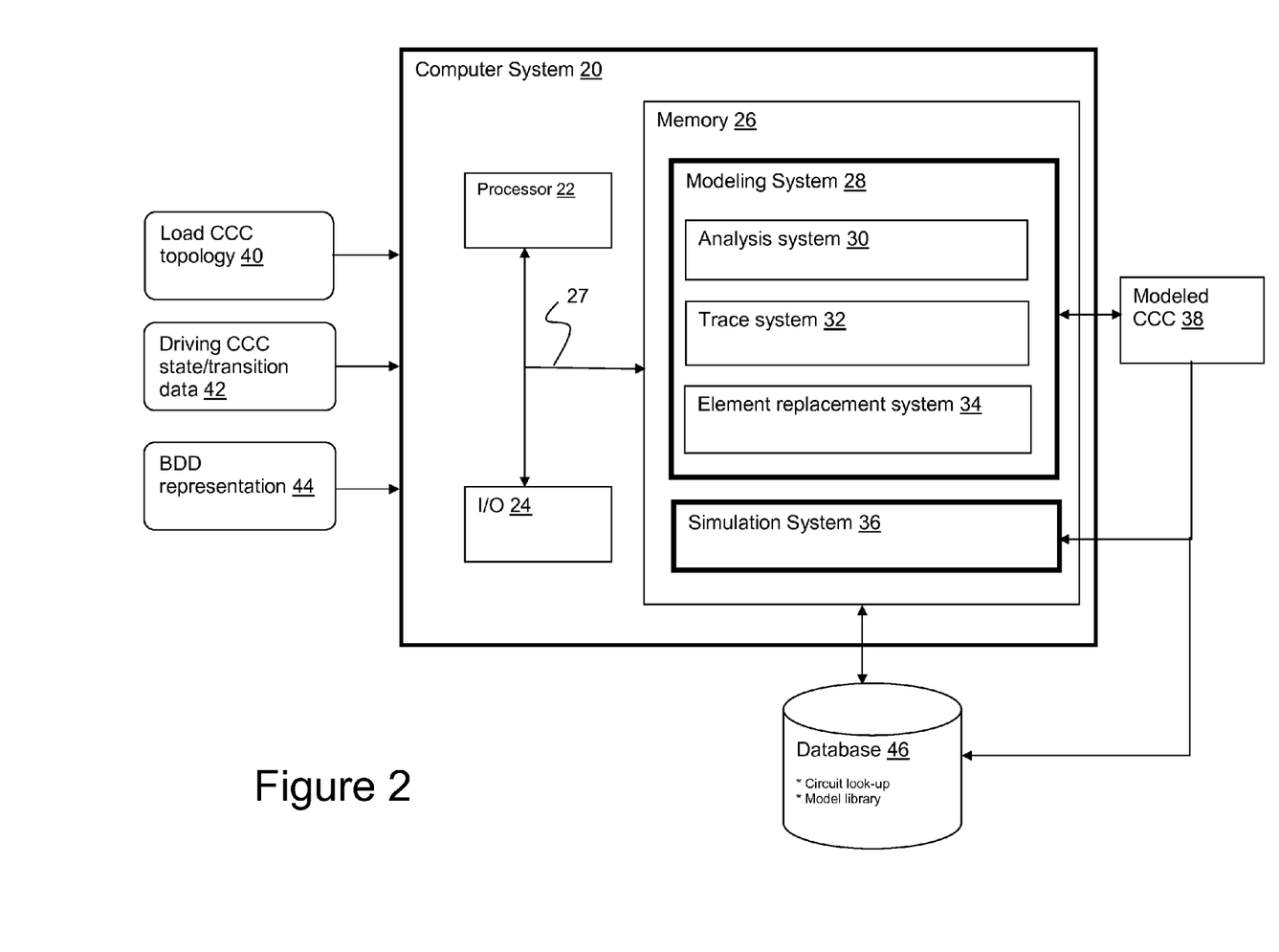
FIG. 2 shows a computer system having a modeling system in accordance with an embodiment of the invention.

Referring now to FIG. 2, an illustrative computer system 20 that includes a modeling system 28 for generating a modeled CCC 38, which approximates an actual load CCC for simulation purposes, e.g., by simulation system 36. Modeling system 28 includes: an analysis system 30 for determining the logical conditions required for the transition or state of the driving CCC for which a load condition is being determined; a trace system 32 that traces along all paths from each load CCC's input terminals (generally gate terminals of one or more FETs); and an element replacement system 34 which, for each circuit element encountered in the trace, inserts an appropriate replacement element in the modeled CCC 38 based on the element type and the state and transition functions of the nets connected to the circuit element.

Analysis system 30 performs a logical analysis of the network containing both the load CCC and (optionally) the driving CCC to determine the possible behaviors of nets within the load CCC during a transition of interest. A Boolean function representation, such as a binary decision diagram (BDD) representation 44, is utilized to compute and represent these possible conditions. As an example, if a driving CCC is an AND gate with inputs A and B and output Z, and a single input rising transition from A to Z is being modeled, input B must be a logical "1". If the net feeding input B also feeds some side input of a load CCC of the AND gate, this information can be used to refine the possible load conditions that the load CCC can impose on the AND gate. This analysis may consider only nets in the driven and driving CCCs, or may also include nets in part of, or their entire, common fan-in cone.

In one approach, possible required logical conditions may be determined by computing the logical state, rising transition, and falling transition functions (e.g., BDDs) for all nets being considered, in terms of previous and next state variables for the "leftmost" of such nets (those not fed by other nets being considered). These might be the input nets of the load CCC, primary inputs of the entire network that feed both the driving and load CCCs, or some intermediate set of nets.

Inputted into modeling system 28 is driving CCC state/transition data 42, which provides state and transition functions for each net required to make a particular transition or hold a particular state. ANDing them together produces a function encoding all possible previous and next state value combinations of the leftmost nets that will produce the state or transition to be modeled.

For example, consider an AND gate with inputs A and B and output Z in which the BDD variables used are Aprev, Anext, Bprev, and Bnext. An Arise function is (~Aprev & Anext), and the Zprev and Znext functions are (Aprev & Bprev) and (Anext & Bnext), respectively, giving a Zrise function of (~(Bprev & Aprev) & Anext & Bnext). Combining these with the "single input transition" function (used to force modeling of one input transition at a time) gives a total allowable condition function (ACF) for the desired Arise to Zrise signal transition propagation of ACF=(~Aprev & Bprev & Anext & Bnext).

Finally, the allowable condition function ACF can be combined with the state and transition functions of various nets to determine their possible behaviors for the desired transition. The four allowable behavior functions (ABFs) for net X, given net functions Xprev and Xnext, are then:
"stable high": Xprev & Xnext & ACF
"stable low": ~Xprev & ~Xnext & ACF
"rise": ~Xprev & Xnext & ACF
"fall": Xprev & ~Xnext & ACF Any of these functions that are not identically zero indicate that the corresponding condition of net X is possible for the specified transition. The difference between ACF and the ABFs is that ACF specifies the conditions under which the transition of interest can occur on the net driving the load CCC input pin whose load is being modeled, while the ABFs specify conditions under which the input transition of interest can occur and the specified behavior can occur on some other net X within the load CCC. One may also determine allowable combinations of behaviors for different nets in the load CCC by ANDing the appropriate ABFs, e.g., if (Xprev & Xnext & ~Yprev & ~Ynext & ACF) is not identically zero, it is possible for X to be stable high and Y to be stable low during the transition of interest.

Other allowable behavior functions may be computed as well, including an "undriven," "high impedance," or "Z state" function for a net, which is true when there is no active path to the net from Vdd (the logical "1" source) or Ground (the logical "0" source), and transition functions to and from high impedance (e.g., 0->Z, 1->Z, Z->0, Z->1).

As noted, trace system 32 traces along all paths from the load CCC input terminals based on the load CCC topology 40. This trace will terminate when a net is encountered that is determined not to significantly affect the effective load of the load CCC. Generally, this will occur when an element is encountered that is connected only to non-switching nets. This will be determined using the ABFs computed above. Specifically, if both the rise and fall ABFs for a net are always false, there is no way that net can switch under conditions that cause the transition being modeled to occur.

Other search termination conditions may be specified for different device types. For example, a trace through a capacitor may terminate at a node that is always at high impedance (i.e., whose allowable "Z-state" function is always true).

Note that the ABFs may allow more than one behavior for a net. Different tracing may be performed depending on whether a maximum or minimum load (for a maximum or minimum delay) is being computed. For example, a FET that provides a channel connection to the loading input of the load CCC will be off for a minimum load and on for a maximum load. Nodes capacitively coupled to the loading input of the load CCC will be switching in the same direction for a minimum load and switching in the opposite direction for a maximum load.

Element replacement system 34 may be implemented as follows:

For FETs:
 I. Treat any source or drain connection to an FET that is encountered and that remains OFF during the transition (i.e., whose gate may be low for an NFET or high for a PFET) as an open circuit and replace it with a grounded capacitor that is obtained from the look-up database 46. This mechanism excludes from the modeled CCC 38 those parts of the load CCC which do not strongly influence its input impedance (for the particular combination of stimuli being considered).
 II. Replace FETs that remain ON during the transition (i.e., whose gate may be high for an NFET or low for a PFET) with a resistor representing the channel of the device and capacitors at its terminal nodes. The values of these circuit elements are obtained from the look-up database 46.
 III. Include FETs that transition from an ON state to an OFF state or vice versa (i.e., whose gate signals may transition), in the modeled CCC 38 without any simplification of the FET itself. This ensures the accuracy of the input impedance of the modeled CCC 38 and is crucial to capturing Miller Effect.

Capacitors are only included if both of their nodes end up in the modeled CCC 38, or if one node is in the modeled CCC 38 and the other node is ground. If the other node is not ground, then it must be separately checked to identify it as a "high impedance" node. If it is a high impedance node, then the capacitor may be excluded from the modeled CCC 38, or it may be replaced with the series capacitive sum of its value and the parallel sum of all grounded capacitances connected to the high impedance node.

Resistors, inductors, and voltage sources are always included when encountered.

An illustrative algorithm is as follows:
Start tracing from the primary input (PI) node of the load CCC and include any interconnect elements up to FETs. Defer processing floating (i.e. non-grounded) capacitors until the end of the algorithm.
For every FET reached during the previous step, use the BDD of the original load CCC along with the stimuli information to determine which category the FET belongs to.
 If the device is from category I, replace the device with an appropriate capacitor at the node that the device was first encountered.
 If the device is from category II, replace the device with R and Cs, as described herein, and ensure that other nodes of the device are included in the reduced CCC and are later explored.
 If it is a category III device, include the device as is and ensure that other nodes of the device are later explored.
Continue exploring any nodes that were added as the result of processing the devices in the previous step.
Stop tracing at those nodes that are either the ground or could be traced to the ground node via a chain of independent voltage sources (voltage source nodes).
Stop when there are no more nodes/branches to explore.
Process floating capacitors deferred from earlier steps. For each deferred floating capacitor, if both nodes are included in the modeled CCC 38, then include the floating capacitor. If only one node is included in the modeled CCC 38, then check that the other node is a "high impedance" node. If it is high impedance, then do not include the floating capacitor in the reduced circuit, or replace it with a grounded capacitor with a value equal to the series capacitive sum of the floating capacitor value and the parallel sum of all grounded capacitances connected to the high impedance node. If it is not high impedance, then replace the floating capacitor with a grounded capacitor of the same value in the modeled CCC 38.

Once complete, the modeled CCC 38 may be used as input to simulation system 36 to provide input load characteristics for a driving CCC. Note that database 46 may incorporate a circuit look-up for replacing circuit elements. In addition, database 46 may include a model library that stores modeled CCCs 38 for future "re-use."

Figure 3A:
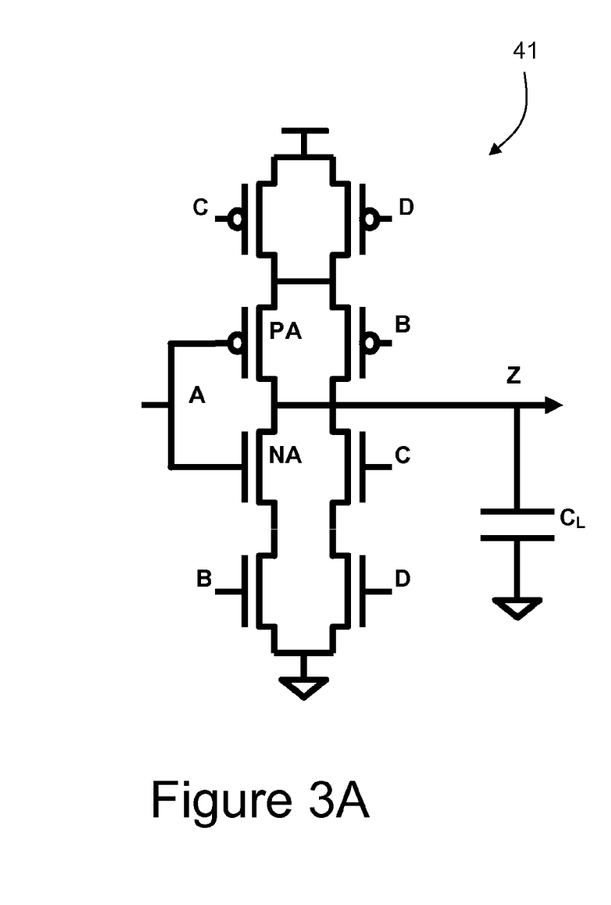
FIGS. 3A and 3B show an illustrative load CCC and modeled CCC in accordance with an embodiment of the invention.
Figure 3B:
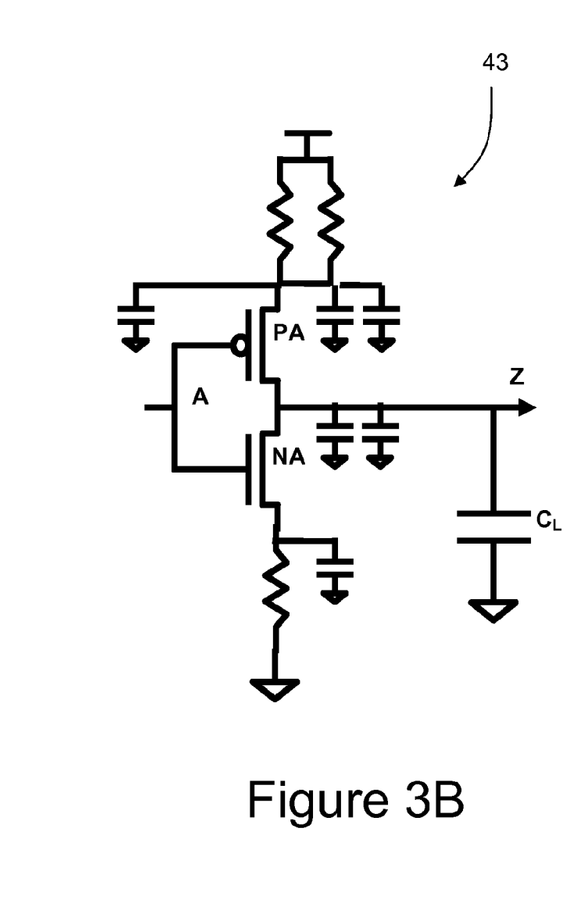

FIGS. 3A and 3B show an illustrative load CCC 41 and modeled CCC 43. In this example, a late mode (i.e., maximum Miller effect) modeled CCC 43 is provided for transitioning node A in the original load CCC 41, in which B=1, C=0 and D=0. As can be seen, all of the transistors, except for PA and NA, have been replaced with capacitors and resistors. The result is a much less complex circuit, i.e., modeled CCC 43.

Figure 4:
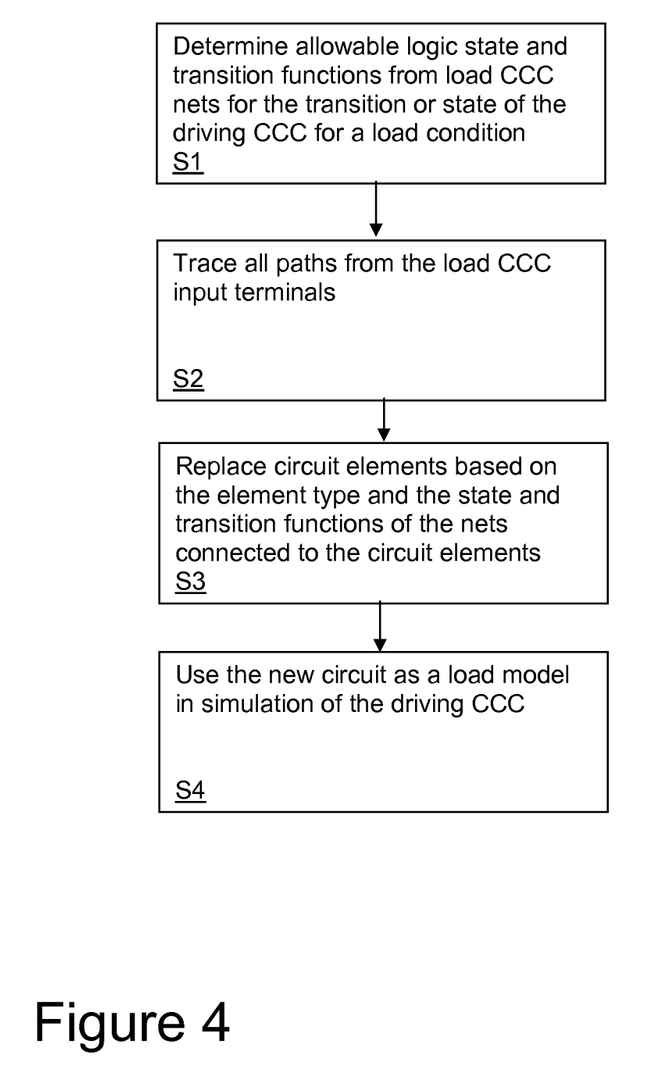
FIG. 4 shows a flow diagram showing a method in accordance with an embodiment of the invention.

FIG. 4 provides a flow diagram showing a method of the present invention. At S1, determine the allowable logic state and transition functions for nets in the load CCC nets for the transition or state of the driving CCC for which a load condition is being determined. As noted above, a Boolean function representation such as a BDD may be utilized. This analysis includes determining whether a net switches given the inputs or whether a net can switch at all under a set of input constraints. At S2, all paths from the load CCC input terminals are traced. The trace along a given path will terminate when a net is determined not to significantly affect the load characteristics of the load CCC. At S3, circuit elements are replaced along the trace based on the element type and the state and transition functions of the nets connected to the circuit elements. For FETs, those that remain off during the transition can be replaced by a capacitor, those that remain on during the transition can be replaced by an RC circuit, and those that switch can be kept intact. An equivalent circuit look-up database can be utilized for this process. Finally, at S4, the new circuit is used as a load model for simulations involving the driving CCC.

The above concepts can be extended in several ways.

Multi-Sink Nets

The preceding embodiments address a single sink CCC of a net. However, many nets have multiple sinks, and it is useful to determine the possible combinations of load models. For example, consider a net X driving a rising transition into two NAND gates which have complementary values on their other inputs. Both of these sink loads may exhibit a Miller effect load increase due to coupling to an oppositely transitioning output, under certain circumstances, but if the second input to each NAND gate is stable when the transition of interest occurs (e.g., if it has an earlier arrival time), only one of the loads can exhibit this Miller effect load increase for any given transition.

The above analysis can be extended to consider combinations of loading effects on different sinks, and compute a similar logical function to determine whether particular combinations can occur. This can also be used to consider different combinations of loading effects (internal net behaviors) within a single load CCC.

Multiple Sensitizations for a Single Delay

In some cases there are multiple conditions within a driving CCC that can cause the same input to output signal propagation. When it is not possible to determine a priori which conditions lead to minimum and maximum delay values, a simulation based delay calculation engine may perform multiple simulations to compute different possible delay values for the same "delay edge" in the timing graph. When this occurs, it may be useful to derive different load models for each possible simulation, considering those sink CCC behaviors that are consistent with the driving transition and all side input sensitizations in the driving CCC for the particular simulation.

Other Logical Constraints

Under some circumstances, it may be possible to determine additional constraints on the possible logical behavior of a network beyond those derivable from a simple Boolean analysis of the network. Examples include: user asserted constraints, externally applied do not care conditions, or constraints required for proper electrical operation (e.g., the requirement that exactly one input of a transmission gate multiplexor be active at any time). In such cases the additional constraints may be expressed as Boolean functions that must always be true, and all such constraint functions can be ANDed into the ACF function described above to further restrict the possible loading conditions.

Selecting Among Multiple Possible Load Models

Under some circumstances there may be multiple logical sensitizations of one or more loads of a transitioning gate output that are consistent with a particular transition (and driving gate sensitization) of the driving gate, and it may be that the worst conditions (maximum or minimum load condition) for each net involved in the network cannot occur simultaneously. For example, if a transitioning signal drives the upper NFETs of each of two NAND gates, and the other inputs of these NAND gates are driven by complementary signals. One of these NAND gates (the one whose other input is high) will then exhibit Miller amplification of its NFET and PFET gate loads, due to coupling to the transitioning output of the NAND gate, while the other will not. This may be addressed in different ways including the following, or combinations of them:

1. The different sensitizing conditions for the load (i.e., the signal driving directly and through an inverter the second NAND gate inputs in the above example) may be ordered according to their expected impacts on the load network. The logical condition that causes the maximum impact contributor or combination of contributors to occur can be chosen.
2. The conflicting conditions may be ignored, and a logically inconsistent but pessimistic combination of load contributing conditions may be chosen.
3. Multiple simulations may be performed, one for each contributing condition combination that cannot be determined (e.g., through an ordering as in method above) to be strictly less pessimistic than at least one simulated contributor condition.

Performance Versus Accuracy Considerations

While the disclosed approach provides more accurate load modeling than simple lumped capacitor loads, there is a run time penalty for this added accuracy. To minimize this penalty, the method may be applied as part of a variable detailed analysis flow, in which a first estimate of timing information is determined using simple load models for all CCCs, and those CCCs that are determined from this first analysis to be possibly critical will be re-analyzed using the more accurate load modeling approach disclosed herein. Such variable detail approaches are used commonly in static timing analysis and are well known to those skilled in the art.

Referring again to FIG. 2, it is understood that modeling system 28 may be implemented using any type of computing device (i.e., computer system 20). Such a computing device generally includes a processor 22, input/output (I/O 24), memory 26, and bus 27. The processor 22 may comprise a single processing unit, or be distributed across one or more processing units in one or more locations, e.g., on a client and server. Memory 26 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 24 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a modeling system 28 could be created, maintained and/or deployed by a service provider that offers the functions described herein for customers. That is, a service provider could offer to deploy or provide the ability to provide modeled CCCs 38 as described above.

It is understood that in addition to being implemented as a system and method, the features may be provided as one or more program products stored on a computer-readable storage medium, which when run, enables a computer system to provide a modeling system 28. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system, comprising:
at least one processing unit;
memory operably associated with the at least one processing unit;
a modeling system for modeling a load effect of a load channel connected component (CCC) in a transistor network that is storable in memory and executable by the at least one processing unit, the modeling system comprising:
an analysis system that determines allowable logical state and transition functions for nets in a load CCC for a transition or state of a driving CCC for which a load condition is being determined;
a trace system that traverses paths in the load CCC from a set of input terminals; and
an element replacement system that replaces circuit elements in the load CCC to create a modeled CCC, wherein a circuit element replacement is based on a type of circuit element encountered along a trace, and state and transition functions of nets connected to an encountered circuit element, wherein the element replacement system:
causes field effect transistors (FETs) that remain off during a transition to be replaced by a capacitor;
causes FETs that remain on during a transition to be replaced by an RC circuit; and
causes FETs that switch during a transition to be kept intact.

2. The computer system of claim 1, further comprising a simulation system for simulating an operation of the driving CCC based on the modeled CCC.

3. The computer system of claim 1, wherein the analysis system utilizes a Boolean function representation to represent logical states and transition functions.

4. The computer system of claim 1, wherein the analysis system analyzes loading effects of the load CCC for a minimum or maximum delay calculation.

5. The computer system of claim 1, wherein the allowable logical state and transition functions determine whether a net can switch under a set of input constraints.

6. The computer system of claim 1, wherein the element replacement system utilizes a circuit look-up database to replace circuit elements.

7. A method, performed on a computer system, for modeling a load effect of a load channel connected component (CCC) in a transistor network, comprising:
using the computer system to perform actions comprising:
determining allowable logical state and transition functions for nets in a load CCC for a transition or state of a driving CCC for which a load condition is being determined;
tracing paths in the load CCC from a set of input terminals; and
replacing circuit elements in the load CCC to create a modeled CCC, wherein a circuit element replacement is based on a type of circuit element encountered along a trace, and state and transition functions of nets connected to an encountered circuit element, wherein field effect transistors (FETs) that remain off during a transition are replaced by a capacitor, FETs that remain on during a transition are replaced by an RC circuit and FETs that switch during a transition are kept intact.

8. The method of claim 7, further comprising simulating an operation of the driving CCC based on the modeled CCC.

9. The method of claim 7, wherein a Boolean function representation is utilized to represent logical states and transition functions.

10. The method of claim 7, wherein loading effects of the load CCC are modeled for a minimum or maximum delay calculation.

11. The method of claim 7, wherein the allowable logical state and transition functions determine whether a net can switch under a set of input constraints.

12. The method of claim 7, wherein a circuit look-up database is utilized to replace circuit elements.

13. A non-transitory computer-readable medium having a program product stored thereon for modeling a load effect of a load channel connected component (CCC) in a transistor network, comprising:
    program code for determining allowable logical state and transition functions for nets in a load CCC for a transition or state of a driving CCC for which a load condition is being determined;
    program code for tracing paths in the load CCC from a set of input terminals; and
    program code for replacing circuit elements in the load CCC to create a modeled CCC, wherein a circuit element replacement is based on a type of circuit element encountered along a trace, and state and transition functions of nets connected to an encountered circuit element, wherein field effect transistors (FETs) that remain off during a transition are replaced by a capacitor, FETs that remain on during a transition are replaced by an RC circuit and FETs that switch during a transition are kept intact.

14. The non-transitory computer-readable medium of claim 13, further comprising program code for simulating an operation of the driving CCC based on the modeled CCC.

15. The non-transitory computer-readable medium of claim 13, wherein a Boolean function representation is utilized to represent logical states and transition functions.

16. The non-transitory computer-readable medium of claim 13, wherein loading effects of the load CCC are modeled for a minimum or maximum delay calculation.

17. The non-transitory computer-readable medium of claim 13, wherein the allowable logical state and transition functions determine whether a net can switch under a set of input constraints.

* * * * *